US012044269B2

(12) United States Patent
Funahashi et al.

(10) Patent No.: US 12,044,269 B2
(45) Date of Patent: Jul. 23, 2024

(54) OUTER CASING ATTACHMENT STRUCTURE

(71) Applicant: HI-LEX CORPORATION, Hyogo (JP)

(72) Inventors: Nobuhiro Funahashi, Hyogo (JP); Yoshihiro Wada, Tochigi (JP); Ryochi Kuribayashi, Tochigi (JP)

(73) Assignee: HI-LEX CORPORATION, Hyogo (JP)

( * ) Notice: Subject to any disclaimer, the term of this patent is extended or adjusted under 35 U.S.C. 154(b) by 80 days.

(21) Appl. No.: 17/772,125

(22) PCT Filed: Oct. 29, 2020

(86) PCT No.: PCT/JP2020/040550
§ 371 (c)(1),
(2) Date: Apr. 26, 2022

(87) PCT Pub. No.: WO2021/085516
PCT Pub. Date: May 6, 2021

(65) Prior Publication Data
US 2022/0397148 A1 Dec. 15, 2022

(30) Foreign Application Priority Data
Oct. 29, 2019 (JP) .................. 2019-196297

(51) Int. Cl.
*F16C 1/10* (2006.01)
*H02G 3/08* (2006.01)

(52) U.S. Cl.
CPC .............. *F16C 1/101* (2013.01); *F16C 1/106* (2013.01); *H02G 3/081* (2013.01); *F16C 2326/01* (2013.01)

(58) Field of Classification Search
CPC ...................................................... F16C 1/106
See application file for complete search history.

(56) References Cited

U.S. PATENT DOCUMENTS 10,138,924 B2 * 11/2018 Sano ................. F16C 1/101
2013/0247709 A1 * 9/2013 Sano ................. F16C 1/101
74/502.6

(Continued)

FOREIGN PATENT DOCUMENTS

JP 03-080117 U 8/1991
JP 2016-180437 A 10/2016
WO 9729290 A1 8/1997

OTHER PUBLICATIONS

International Search Report PCT/JP2020/040550 mailed Dec. 28, 2020.

*Primary Examiner* — Vicky A Johnson
(74) *Attorney, Agent, or Firm* — Shih IP Law Group, PLLC.

(57) ABSTRACT

An outer casing attachment structure includes a cables extending in a same direction, outer casings to which the inner cables is respectively inserted, a connecting member to which ends of the outer casings are connected, and a holding member including a holding part configured to hold the connecting member, wherein an installation space where the connecting member is disposed, and an opening provided in a direction perpendicular to an axis direction of the inner cables and configured to communicate between the installation space and outside are formed in the holding part, wherein the holding part includes a first retainer part and a second retainer part formed on both sides of the opening in an arrangement direction of the inner cables, and the connecting member includes a first engaging part configured to engage with the first retainer part, and a second engaging part configured to engage with the second retainer part.

6 Claims, 11 Drawing Sheets

(56) References Cited

U.S. PATENT DOCUMENTS

2017/0254354 A1\* 9/2017 Carabalona ............ F16C 1/101
2018/0119723 A1 5/2018 Naoi \* cited by examiner

OUTER CASING ATTACHMENT STRUCTURE

TECHNICAL FIELD

The present invention relates to an outer casing attachment structure.

BACKGROUND ART

A cable connecting structure is used to connect a plurality of cables in mechanical devices that require remote operation of multiple components, such as automobiles (see, for example, PTL 1). In the cable coupling structure disclosed in PTL 1, one cable is connected to one end in the movement direction of a slider disposed in a slider housing member, and another cable is connected to the other end. For example, when one cable is pulled, the slider moves in the slider housing member, and the other cable is pulled as the slider moves.

The cable is covered with an outer casing on the outside of the slider housing member, and the outer casing is connected to the slider housing member by a casing cap as a connecting member. On the other hand, when a double latch is used in a vehicle with a large hood, it is necessary to release two latches at the same time with a single operation, and in this case, two cable is connected to either end of the slider described above.

CITATION LIST

Patent Literature

PTL 1
Japanese Patent Application Laid-Open No. 2016-180437

SUMMARY OF INVENTION

Technical Problem

Since using a connection member for each of the two cables would increase the number of parts and take time to manufacture, it is conceivable to combine the two connection members into one. However, when the two cables move, the connection member may come off from the holding part of the connection member of the slider housing member. An object of the present invention is to provide an outer casing attachment structure that can suppress the coming-off from the connecting member to which the outer casing is connected, from the holding part.

Solution to Problem

A plurality of aspects is described below as solutions to problem. These aspects may be combined as necessary.

An outer casing attachment structure according to an aspect of the present invention includes a plurality of inner cables, a plurality of outer casings, a connecting member, and a holding member. The plurality of inner cables extends in the same direction. The plurality of inner cables is respectively inserted in the plurality of outer casings. The ends of the plurality of outer casings are connected to the connecting member. Holding member includes a holding part that holds a connecting member. An installation space where the connecting member is disposed, and an opening provided in a direction perpendicular to an axis direction of the plurality of inner cables and configured to communicate between the installation space and outside are formed in the holding part. The holding part includes a first retainer part and a second retainer part. The first retainer part and the second retainer part are formed on both sides of the opening in the arrangement direction of the plurality of inner cables. The connecting member includes a first engaging part and a second engaging part. The first engaging part is engaged with a first retainer part. The second engaging part is engaged with a second retainer part.

In this manner, the holding part includes a first retainer part and a second retainer part, and the connecting member includes a first engaging part configured to engage with the first retainer part, and a second engaging part configured to engage with the second retainer part. The connecting member that connects the outer casing to the holding member is locked to the holding part of the holding member at two portions, and thus even when the inner cable moves, the movement of the connecting member can be restricted, and the coming-off of the holding part can be suppressed.

Each of the first retainer part and the second retainer part may be a protrusion. Each of the first engaging part and the second engaging part may be a recess formed in the connecting member. With the engagement of the protrusion with the recess, even when the inner cable moves, the movement of the connecting member at the holding part can be restricted, and the coming-off of the connecting member from the holding part can be prevented.

The holding part may include a fitting part formed at an edge of the installation space that faces the opening. The connecting member may include a fitted part configured to be fitted with the fitting part. The fitting part may be fit with the fitted part in a state where the connecting member is held by the holding part. With the fitting of the fitting part with the fitted part, even when the inner cable moves, the movement of the connecting member at the holding part can be further restricted, and thus the coming-off of the connecting member from the holding part can be prevented.

The fitting part may be a protrusion protruded from the edge of the installation space. The fitted part may be a recess formed in the connecting member. With the fitting of the protrusion with the recess, even when the inner cable moves, the movement of the connecting member at the holding part can be restricted, and thus the coming-off of the connecting member from the holding part can be suppressed.

The holding part may include an inclined part provided on the outside of the second retainer part. The inclined part may be formed to guide the second engaging part side of the connecting member to the installation space when the connecting member is rotated in a state where the first engaging part is engaged with the first retainer part to insert the connecting member to the installation space. With the inclined part provided in the above-described manner, the connecting member can be disposed in the installation space along the inclined part while rotating the connecting member, and thus it is easy to attach the connecting member to the holding part.

Advantageous Effects of Invention

According to the present invention, it is possible to provide an outer casing attachment structure that can suppress the coming-off of the casing cap from the holding part of the cap.

DESCRIPTION OF EMBODIMENTS

An outer casing attachment structure according to an embodiment of the present invention is described below with reference to the drawings.

Note that the following describes an exemplary case where the outer casing attachment structure of the present embodiment is used for a coupling mechanism of a cable.

Overview of Cable Coupling Structure 1

Figure 1:
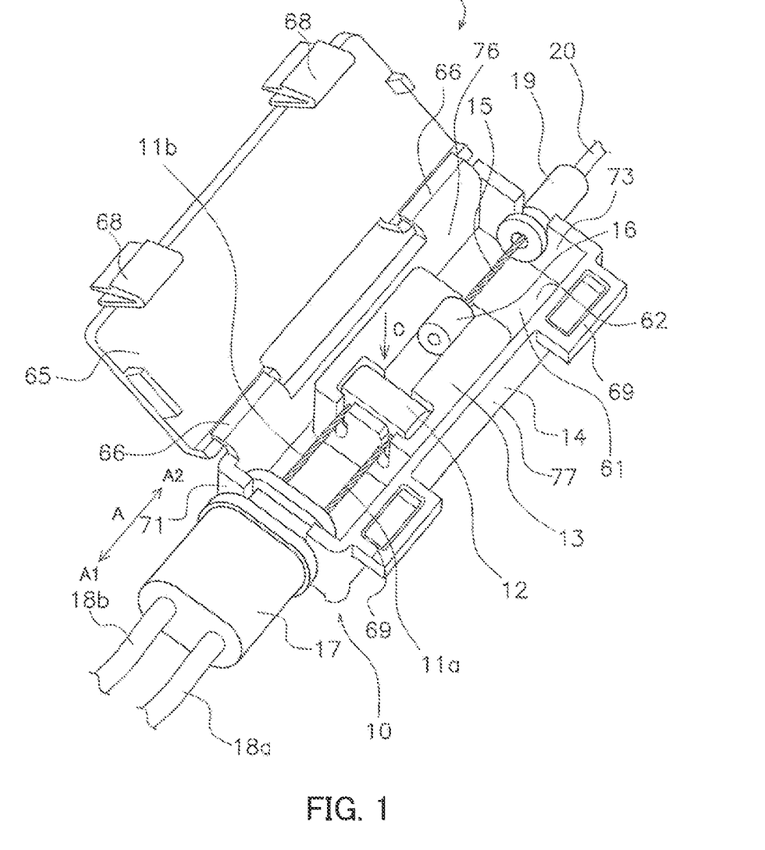
FIG. 1 is a perspective view illustrating a cable coupling structure using an outer casing attachment structure according to an embodiment of the present invention.

FIG. 1 is a perspective view illustrating cable coupling structure 1 as an example in which the outer casing attachment structure according to the embodiment of the present invention is used.

Cable coupling structure 1 is a mechanism that couples a plurality of first inner cables 11a and 11b with second inner cable 15 through moving member 13. Outer casing attachment structure 10 used in cable coupling structure 1 is a structure that attaches, to holding member 14, connecting member 17 where first outer casings 18a and 18b that cover each of the plurality of first inner cables 11a and 11b is attached. Note that in the example illustrated in FIG. 1, holding member 14 is a box-shaped member, and connecting member 17 is attached to holding member 14. In addition, moving member 13 is configured to be movable inside holding member 14 along axis direction A of first inner cables 11a and 11b. Note that in FIG. 1, the plurality of first inner cables 11a and 11b is coupled with second inner cable 15 through moving member 13, but it is not limited to the cable as long as it can move moving member 13 or drive along with the movement.

Outer Casing Attachment Structure 10

Outer casing attachment structure 10 includes the plurality of first inner cables 11a and 11b, a plurality of first outer casings 18a and 18b, connecting member 17, and holding member 14.

First Inner Cables 11a and 11b

As illustrated in FIG. 1, the plurality of first inner cables 11a and 11b extends in the same direction (see arrow A1). In the present embodiment, for example, two first inner cables 11a and 11b are provided, but not limited thereto. In addition, it suffices that first inner cables 11a and 11b extend in the same direction in holding member 14, and, outside holding member 14, it is appropriately wired and therefore it need not extend in the same direction. Note that axis direction A includes direction A1 in which first inner cables 11a and 11b extend, and direction A2 opposite direction A1.

Figure 2:
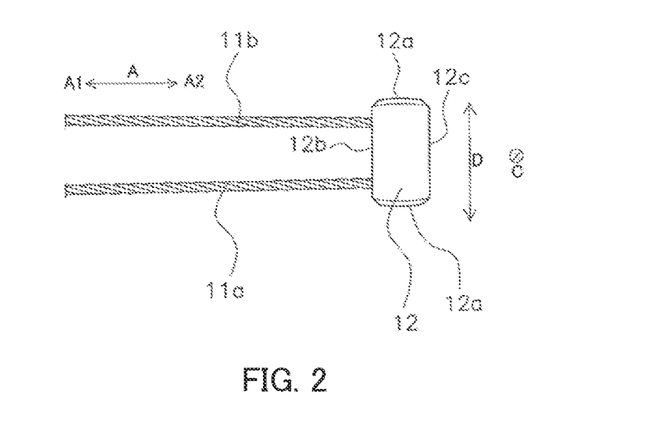
FIG. 2 is a plan view illustrating a state where a plurality of first cables of the outer casing attachment structure of FIG. 1 is connected to a first terminal member.

The end of the plurality of first inner cables 11a and 11b located inside holding member 14 is connected to one first terminal member 12. FIG. 2 is a plan view illustrating first inner cables 11a and 11b and first terminal member 12. First terminal member 12 is a member with a substantially cuboid shape, and includes end surface 12a at both sides in width direction D. Width direction D is the arrangement direction of the plurality of first inner cables 11a and 11b. In addition, first terminal member 12 includes axis direction side surfaces 12b and 12c provided on one side and the other side in axis direction A. Ends of first inner cables 11a and 11b are connected to axis direction side surface 12b. Axis direction side surface 12c is a surface on the opposite side of axis direction side surface 12b in axis direction A. In the present embodiment, two end surfaces 12a and axis direction side surfaces 12b and 12c are substantially flat surfaces, but not limited thereto, and they may be curved surfaces.

When first terminal member 12 is inserted to first housing part 21 of moving member 13 described later along arrow C direction (see FIG. 1), first inner cables 11a and 11b are connected to moving member 13. Note that while the plurality of first inner cables 11a and 11b are connected to one first terminal member 12 in the present embodiment, it is not limited to one terminal member, and the cables may be separately connected to terminal members. In this case, first housing part 21 may be separated into two parts. In addition, arrow C direction is a direction that is substantially perpendicular to axis direction A and width direction D, and is a depth direction from opening 64a to bottom surface 62 in holding member 14 described later.

First Outer Casings 18a and 18b

As illustrated in FIG. 1, the plurality of first inner cables 11a and 11b is inserted to the plurality of first outer casings 18a and 18b, respectively. First inner cable 11a is inserted in first outer casing 18a, and first inner cable 11b is inserted in first outer casing 18b. The plurality of first outer casings 18a and 18b cover the portion outside holding member 14 of first inner cables 11a and 11b.

Connecting Member 17

Ends of the plurality of first outer casings 18a and 18b are connected to connecting member 17. The plurality of first outer casings 18a and 18b are connected to connecting member 17 at respective predetermined positions in the connecting member. As described later, connecting member 17 is held by holding member 14, and therefore connecting member 17 connects first outer casings 18a and 18b to predetermined positions of connecting member 17 such that first outer casings 18a and 18b are located at predetermined positions with respect to holding member 14. As described later, connecting member 17 is inserted to opening 102 provided in holding member 14, and it is therefore preferable to be engaged with respect to the insertion direction of connecting member 17 to opening 102. For example, first outer casings 18a and 18b may be inserted and connected in the axis direction of first outer casings 18a and 18b with respect to connecting member 17, or first outer casings 18a and 18b may be connected to connecting member 17 by bonding. Note that the insertion direction of connecting member 17 to opening 102 is a direction perpendicular to a direction perpendicular to the axes of first outer casings 18a and 18b, and to the direction in which first outer casing 18a and other first outer casing 18b are arranged (i.e., the direction connecting the axes of one first outer casing 18a and other first outer casing 18b in the shortest distance). In the present embodiment, first outer casings 18a and 18b are inserted to holes provided in the direction in which first inner cables 11a and 11b are inserted to connecting member 17, and are thus connected to connecting member 17.

Figure 3A:
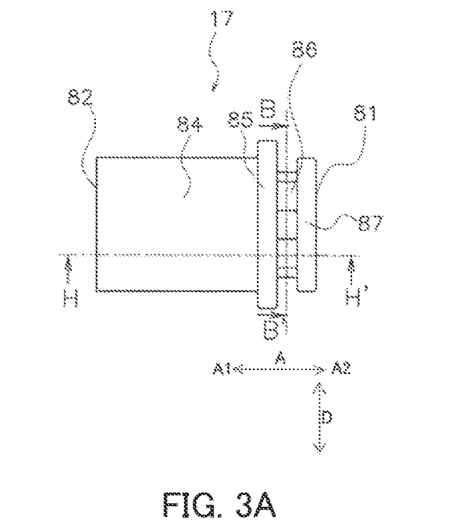
FIG. 3A is a plan view illustrating a connecting member of the outer casing attachment structure of FIG. 1.
Figure 3B:
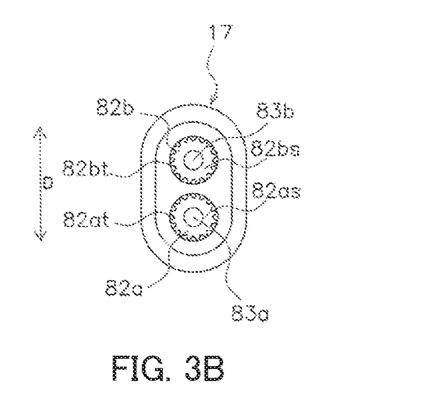
FIG. 3B is a side view of a second end surface side of the connecting member of FIG. 3A.
Figure 3C:
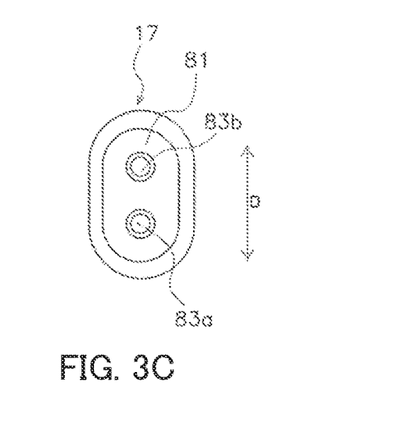
FIG. 3C is a side view of a first end surface side of the connecting member of FIG. 3A.
Figure 4A:
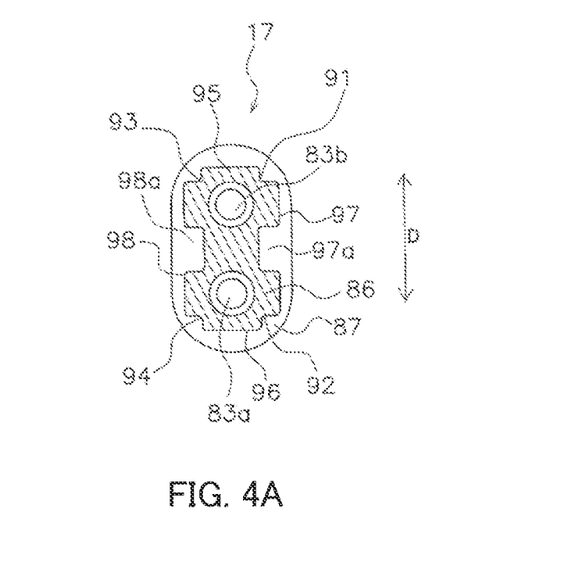
FIG. 4A is an arrow cross sectional view between BB' of FIG. 3A.
Figure 4B:
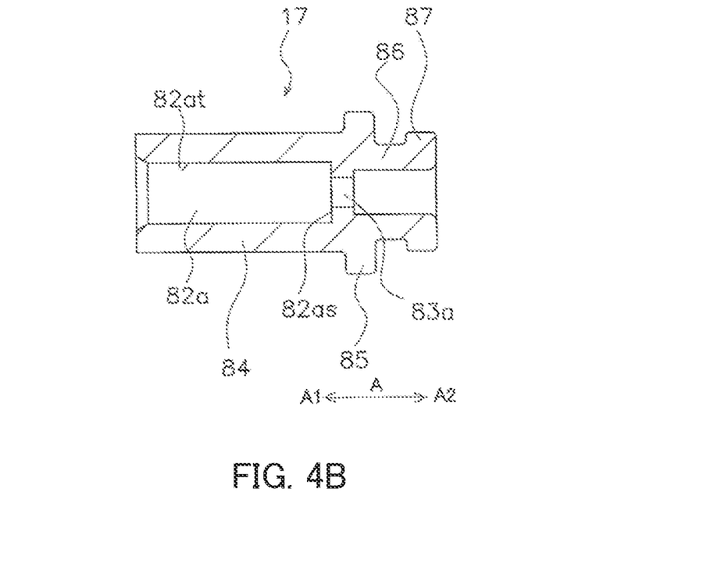
FIG. 4B is an arrow cross sectional view between HH' of FIG. 3A.

FIG. 3A is a plan view illustrating an exemplary connecting member 17. FIG. 3B is a side view illustrating the second end surface on which first outer casings 18a and 18b are connected. FIG. 3C is a side view illustrating the first end surface located inside holding member 14. FIG. 4A is an arrow cross sectional view between BB' of FIG. 3A, and FIG. 4B is an arrow cross sectional view between HH' of FIG. 3A. Connecting member 17 includes first end surface 81 and second end surface 82 provided along axis direction A so as to face each other as illustrated in FIG. 3A. When connecting member 17 is attached to holding member 14, first end surface 81 is located inside holding member 14, and second end surface 82 is located outside holding member 14.

In second end surface 82, two connection holes 82a and 82b that connect first outer casings 18a and 18b are provided along axis direction A. Connection holes 82a and 82b are formed parallel to each other. Connection holes 82a and 82b are formed from first end surface 81 to a middle of second end surface 82. Through holes 83a and 83b are provided from end surfaces 82as and 82bs of connection holes 82a and 82b to first end surface 81 (see FIG. 4B). As illustrated in FIG. 3B, through hole 83a is formed at the center of end surface 82as. Through hole 83b is formed at the center of end surface 82bs.

First outer casing 18a is inserted to connection hole 82a until its end makes contact with end surface 82as. First outer casing 18b is inserted to connection hole 82b until its end makes contact with end surface 82bs. In addition, as illustrated in FIG. 3B, recessed and protruding portions 82at and 82bt are formed in the circumferential direction at the inner peripheral surfaces of connection holes 82a and 82b, and recessed and protruding portions 82at and 82bt function as retainers of first outer casings 18a and 18b. First inner cables 11a and 11b extend inside holding member 14 through the inside of first outer casings 18a and 18b and through holes 83a and 83b.

Connecting member 17 includes held portion 86 that is held by holding part 72 formed in wall part 71 of holding member 14 described later. As an example, as illustrated in FIG. 3A, connecting member 17 of the present embodiment includes insertion portion 84, outer portion 85, held portion 86, and inner portion 87 in this order from second end surface 82 to first end surface 81. Connection holes 82a and 82b are formed in insertion portion 84, and first outer casings 18a and 18b are inserted thereto. Outer portion 85 is configured to have an external shape larger than held portion 86 in axis direction A, and is disposed outside wall part 71. In axis direction A, held portion 86 is provided such that the external shape is smaller than outer portion 85. In axis direction A, inner portion 87 is provided such that its external shape is greater than held portion 86, and is disposed inside wall part 71. Held portion 86 is provided between outer portion 85 and inner portion 87. Even when connecting member 17 is moved in axis direction A due to the driving of first inner cables 11a and 11b in the state where held portion 86 is disposed in arrangement space 101 of wall part 71, the movement of connecting member 17 is restricted by the contact between outer portion 85 or inner portion 87 and wall part 71. Note that the holding of held portion 86 by holding part 72 is described later.

Holding Member 14

Figure 5A:
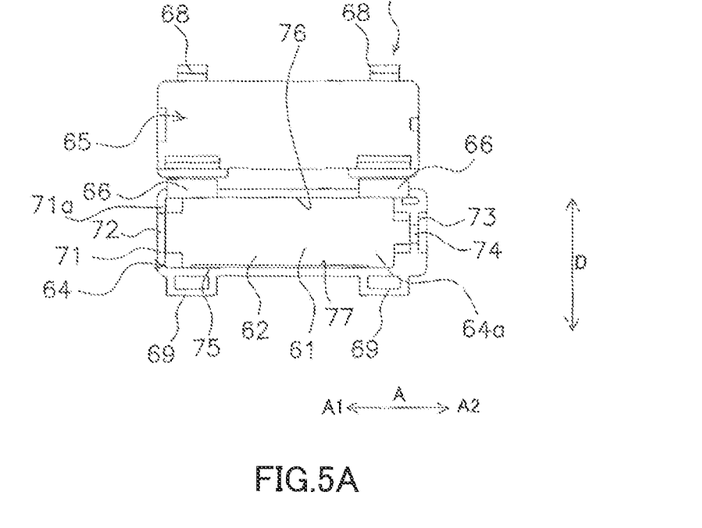
FIG. 5A is a plan view of a holding member of the outer casing attachment structure of FIG. 1.
Figure 5B:
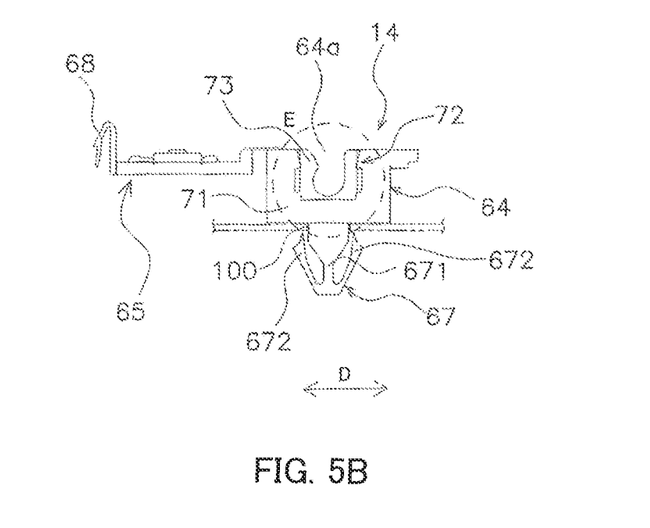
FIG. 5B is a side view of a supporting member of FIG. 5A.

Holding member 14 includes holding part 72 for holding connecting member 17. Holding part 72 is provided for attaching connecting member 17 to holding member 14. While the shape and configuration of holding member 14 and holding part 72 are not limited, holding member 14 of cable coupling structure 1 used for the vehicle illustrated in FIG. 1 is described below as an example. FIG. 5A is a plan view of holding member 14 of the present embodiment. FIG. 5B is a side view of holding member 14 of the present embodiment. Holding member 14 is, for example, a box-shaped member as illustrated in FIGS. 1, 5A and 5B, and has internal space 61 inside.

As illustrated in FIGS. 5A and 5B, holding member 14 includes main body part 64, lid part 65, hinge part 66, and attaching part 67. Holding member 14 of the present embodiment functions as a case of moving member 13. Main body part 64 has a box shape, and includes internal space 61. Main body part 64 includes bottom surface 62 (see FIG. 1), and wall parts 71, 73, 76 and 77 disposed to surround bottom surface 62. As illustrated in FIG. 5A, wall part 71 and wall part 73 are provided facing each other in axis direction A. Wall part 76 and wall part 77 are provided facing each other in width direction D. Width direction D is the direction approximately perpendicular to axis direction A and is the arrangement direction of first inner cables 11a and 11b. Internal space 61 is formed so as to be surrounded by bottom surface 62 and wall parts 71, 73, 76 and 77. Moving member 13 is disposed in internal space 61. Moving member 13 can move along axis direction A in internal space 61 of holding member 14. The length of internal space 61 in axis direction A is greater than the length of moving member 13. In this manner, moving member 13 can move along axis direction A in internal space 61 of holding member 14. In addition, as illustrated in FIG. 5A, the above-described holding part 72 of connecting member 17 is provided in wall part 71, and the configuration of holding part 72 is described later.

Figure 12:
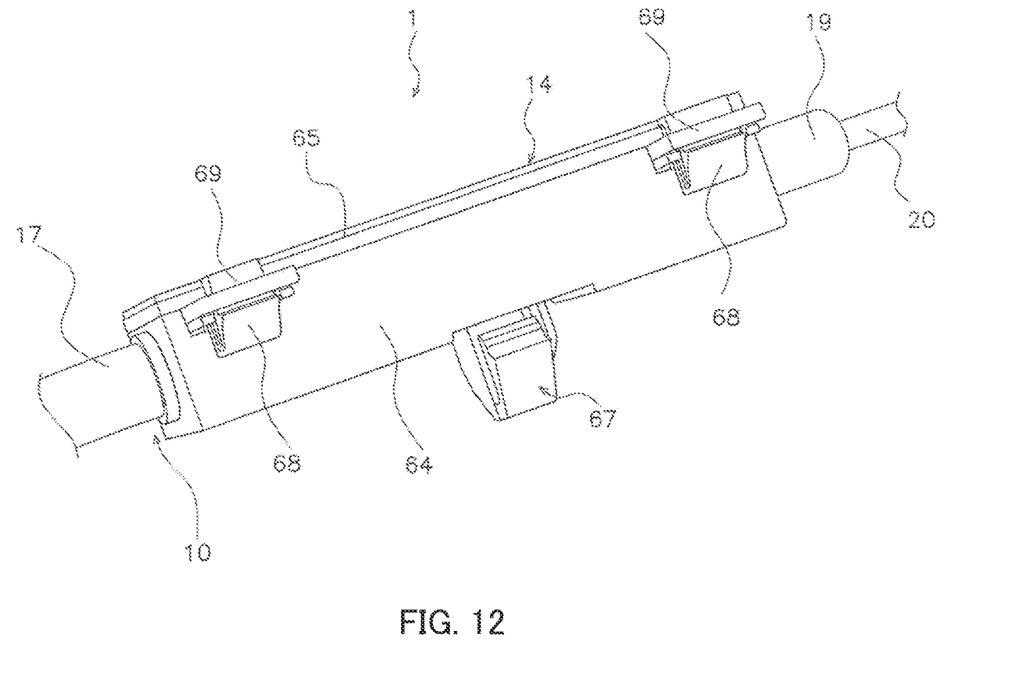
FIG. 12 is a perspective view illustrating a state where a lid part is closed in the cable coupling structure of FIG. 1.

Two hinge parts 66 are provided between an end of lid part 65 and an end of wall part 76. Lid part 65 is connected to main body part 64 through hinge part 66. Lid part 65 can open and close opening 64a formed in one surface of main body part 64. FIG. 12 is a perspective view illustrating cable coupling structure 1 with lid part 65 closed. Two engaging parts 68 are provided at the end of lid part 65 on the side opposite to hinge part 66. Engaged part 69 that can engage with engaging part 68 is provided at the end of main body part 64 on the side opposite to hinge part 66. Lid part 65 can be closed by engaging part 68 with engaged part 69 by pivoting lid part 65 around hinge part 66 toward main body part 64. Note that in the present embodiment, a hole is formed in engaged part 69, and engaging part 68 is configured to have an elastic force that allows for engagement with the edge of the hole after passing through the hole, but the present invention is not limited thereto.

In addition, as illustrated in FIG. 5B, attaching part 67 is provided outside the surface on the side opposite to opening 64a of main body part 64. Attaching part 67 has a pin shape that can be inserted to hole 100. FIG. 5B illustrates hole 100 to which attaching part 67 is inserted. Attaching part 67 includes protruding part 671 protruded from main body part 64, and a pair of engaging parts 672 spread from the end of protruding part 671 toward main body part 64 side. The pair of engaging parts 672 has elasticity. The pair of engaging parts 672 approaches protruding part 671 when passing through hole 100, and spreads after passing through hole 100. In this manner, the coming-off of attaching part 67 from hole 100 is prevented.

Structure for Holding Connecting Member by Holding Member

Figure 5C:
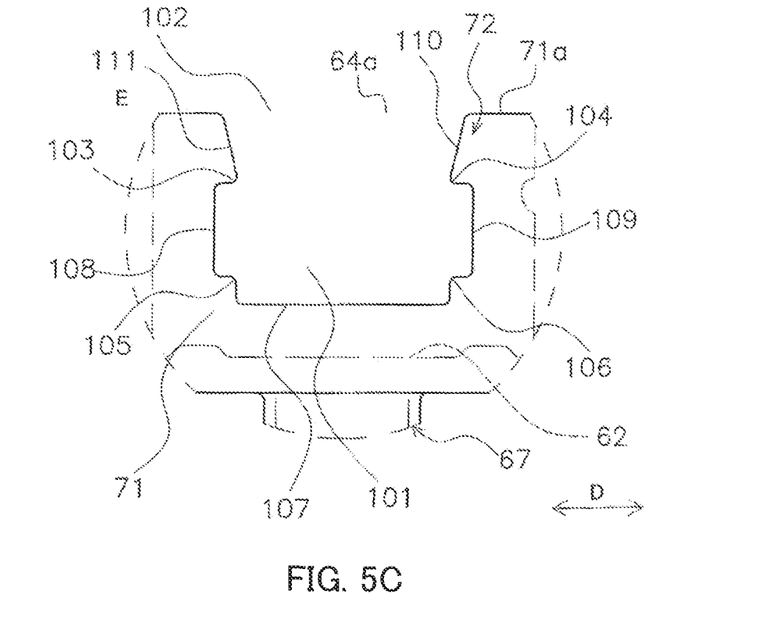
FIG. 5C is an enlarged view of an E-part of FIG. 5B.
Figure 5D:
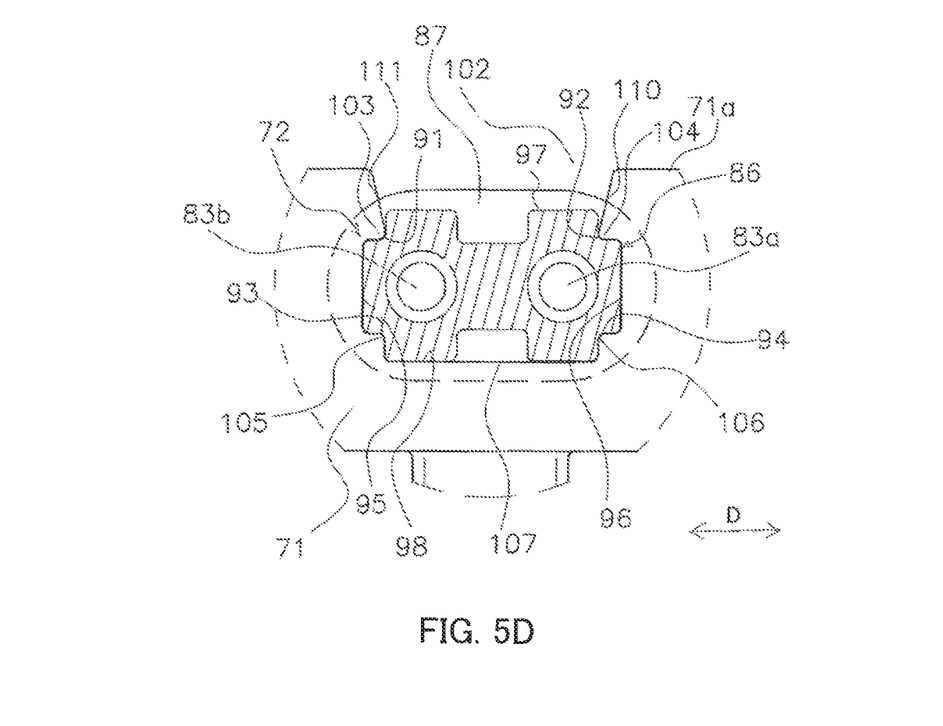
FIG. 5D is a diagram illustrating a state where a held portion of a connecting member is disposed at a holding part of the holding member of FIG. 5C.

In holding part 72, installation space 101 where connecting member is disposed, and opening 102 provided in a direction perpendicular to axis direction A of first inner cables 11a and 11b and configured to communicate between installation space 101 and the outside are formed. As described above, holding part 72 is provided at wall part 71 of holding member 14 as an example. In the present embodiment, wall part 71 is provided as an end portion of holding member 14, which functions as a case, on the first outer casings 18a and 18b side. FIG. 5C is an enlarged view of the E-part of FIG. 5B. Note that in FIG. 5C, wall part 73 is omitted to facilitate the understanding of the configuration of holding part 72. FIG. 5D is a diagram illustrating a state where held portion 86 of connecting member 17 is disposed in installation space 101.

As illustrated in FIG. 5C, installation space 101 is a space extending in axis direction A through wall part 71, and connecting member 17 is disposed in it. Opening 102 is provided at end 71a of wall part 71 (i.e., the edge of opening 64a), and is communicated with installation space 101. Opening 102 and installation space 101 are provided in cutout shapes in wall part 71. As illustrated in FIG. 5C, holding part 72 includes first retainer part 103 and second retainer part 104 formed on both sides of opening 102 in the arrangement direction (width direction D) of the plurality of first inner cables 11a and 11b.

First retainer part 103 is, for example, a protrusion. As illustrated in FIG. 5C, first retainer part 103 is protruded from edge 108 toward the inside of installation space 101. Second retainer part 104 is, for example, a protrusion. Second retainer part 104 is protruded from edge 109 toward the inside of installation space 101. Edges 108 and 109 are edges in width direction D of installation space 101. Note that in the present embodiment, first retainer part 103 and second retainer part 104 are bilaterally symmetric as illustrated in FIG. 5C, but the present invention is not limited thereto.

On the other hand, as illustrated in FIGS. 4A and 5D, connecting member 17 includes first engaging part 91 and second engaging part 92. First engaging part 91 is a recess, and is engaged with first retainer part 103 that is a protrusion. Second engaging part 92 is a recess, and is engaged with second retainer part 104 that is a protrusion. First retainer part 103 and second retainer part 104 are disposed at the upper part of installation space 101, and prevents the coming-off of held portion 86 from opening 102. Note that first retainer part 103 and second retainer part 104 are protrusions as an example, and first engaging part 91 and second engaging part 92 are recesses as an example. However, this is not limitative as long as the engaging part can be engaged with the retainer part. For example, first retainer part 103 and second retainer part 104 may be leaf springs.

As illustrated in FIG. 5C, holding part 72 includes fitting parts 105 and 106 formed at edge 107 of installation space 101 facing opening 102. Fitting parts 105 and 106 are, for example, protrusions protruded from edge 107 of installation space 101. In the present embodiment, fitting part 105 and fitting part 106 face each other in width direction D. In addition, while edge 107 of installation space 101 is parallel to width direction D in the present embodiment, this is not limitative, and it may be bent or curved. Fitting part 105 faces first retainer part 103 in depth direction C. Fitting part 106 faces second retainer part 104 in depth direction C.

While edges 108 and 109 of installation space 101 in the width direction is formed in parallel to depth direction C as an example, this is not limitative, and it may be bent or curved. Note that edge 108 is disposed between first retainer part 103 and fitting part 105, and edge 109 is disposed between second retainer part 104 and fitting part 106. As illustrated in FIG. 4A, connecting member 17 includes fitted parts 93 and 94 that are fitted with fitting parts 105 and 106. Fitted parts 93 and 94 are, for example, recesses.

While fitting parts 105 and 106 are protrusions as an example and fitted parts 93 and 94 are recesses as an example, the shape is not limited as long as the fitting part can fit with the fitted part. Fitting parts 105 and 106 serving as spring members and the like may be fit with fitted parts 105 and 106. Note that fitted part 93 and fitted part 94 are provided to face each other in width direction D. First engaging part 91 and fitted part 93 are formed to face each other in depth direction C. Second engaging part 92 and fitted part 94 are formed to face each other in depth direction C. In addition, while the number of fitting parts 105 and 106 and fitted parts 93 and 94 are each two in the present embodiment, the number may be one.

As illustrated in FIG. 4A, ends 95 and 96 of connecting member 17 in width direction D are in parallel to depth direction C, but this is not limitative, and may be bent or curved. Note that end 95 is disposed between first engaging part 91 and fitted part 93, and end 96 is disposed between second engaging part 92 and fitted part 94. In addition, in the state where held portion 86 is disposed in installation space 101 as illustrated in FIG. 5D, end 97 provided between first engaging part 91 and second engaging part 92 is located on opening 102 side, and end 98 provided between fitted part 93 and fitted part 94 faces edge 107. In addition, in the state where held portion 86 is disposed in installation space 101, end 95 faces edge 108, and end 96 faces edge 109.

In the present embodiment, for example, connecting member 17 has a shape in which a rectangular shape is cut in a cross-sectional view perpendicular to axis direction A. First engaging part 91, second engaging part 92, and held portion 86 of connecting member 17 correspond to cut portions at the four corners of the rectangular shape. In addition, in connecting member 17, cutouts 97a and 98a are formed at the centers of end 97 and end 98 as illustrated in FIG. 4A for the purpose of weight reduction, but cutouts 97a and 98a need not be formed.

Holding part 72 includes inclined part 110 provided on the outside of second retainer part 104. Inclined part 110 is inclined to the outside in the direction from second retainer part 104 toward end 71a. As an example, in the present embodiment, holding part 72 also includes inclined part 111 provided on the outside of first retainer part 103. Inclined part 111 is inclined to the outside in the direction from first retainer part 103 toward end 71a. That is, the distance between inclined part 110 and inclined part 111 increases toward opening 102 from the distance between first retainer part 103 and second retainer part 104. Note that while both inclined part 110 and inclined part 111 are provided in the present embodiment, it suffices that only one of them is provided.

Figure 6A:
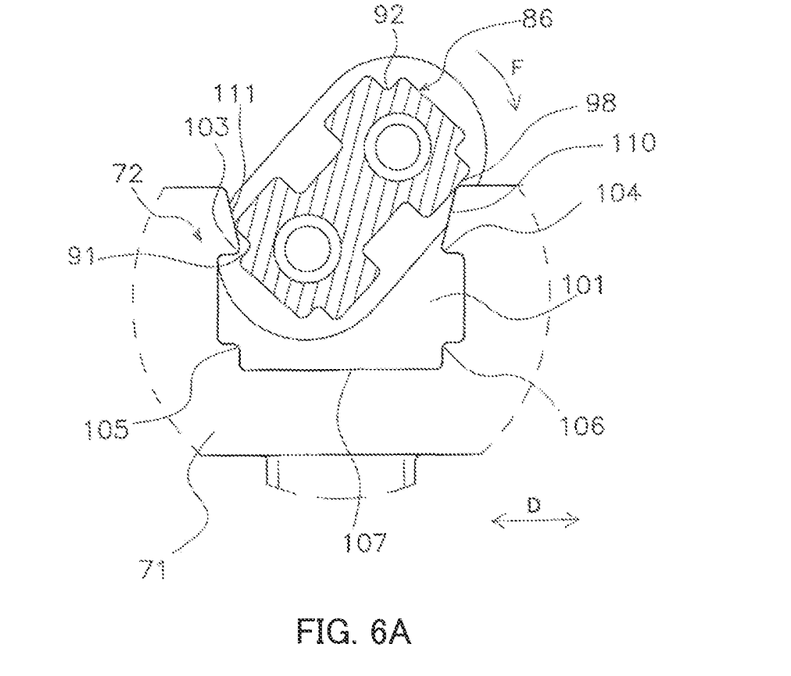
FIG. 6A is a diagram illustrating an operation of attaching the connecting member to the holding member of FIG. 5C.
Figure 6B:
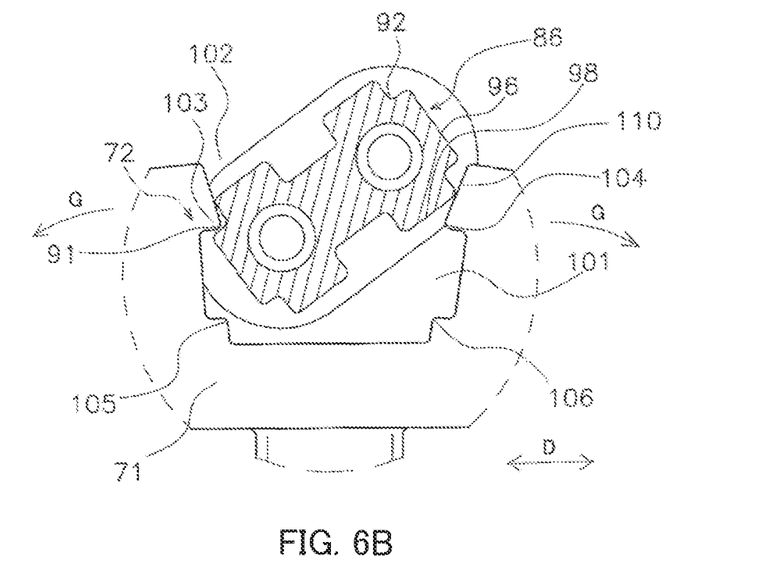
FIG. 6B is a diagram illustrating an operation of attaching the connecting member to the holding member of FIG. 5C.
Figure 7:
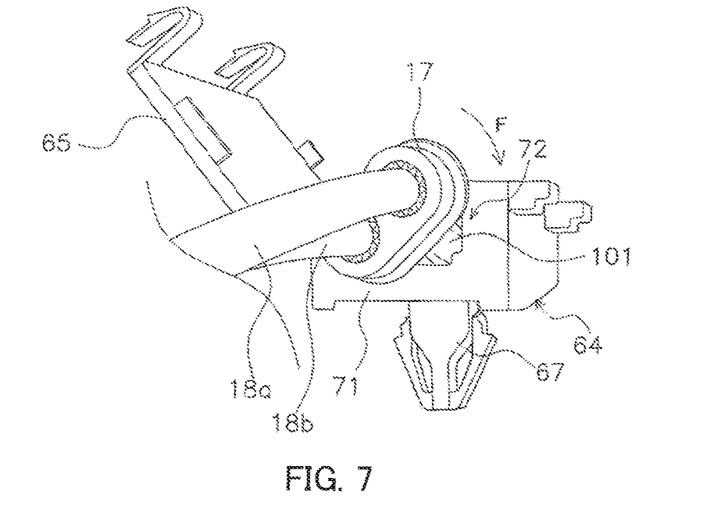
FIG. 7 is an entire perspective view illustrating an operation of attaching the connecting member to the holding member of FIG. 5C.

Inclined part 110 is formed to guide second engaging part 92 side of connecting member 17 to installation space 101 when connecting member 17 is rotated in the state where first engaging part 91 is engaged with first retainer part 103 for insertion of connecting member 17 to installation space 101. FIGS. 6A and 6B are diagrams illustrating the insertion operation of connecting member 17 to installation space 101. As illustrated in FIG. 6A, in the state where first engaging part 91 of held portion 86 is fit with first retainer part 103 of holding part 72, connecting member 17 is rotated (arrow F) and disposed in installation space 101. FIG. 7 is an entire perspective view illustrating the state of FIG. 6A. As illustrated in FIG. 6B, when connecting member 17 is rotated in the arrow F direction, end 98 of held portion 86 of connecting member 17 slides with inclined part 110, and wall part 71 bends so as to open in width direction D to increase opening 102 (see arrow G). Here, holding member 14 has a flexibility for spreading opening 102 when a force is applied to inclined part 110 from connecting member 17.

Figure 8A:
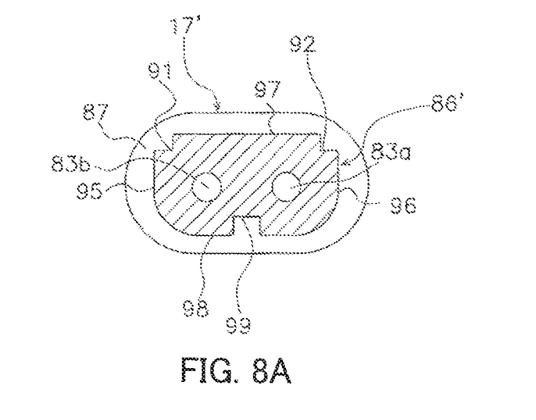
FIG. 8A is a sectional view illustrating another example of the connecting member.
Figure 8B:
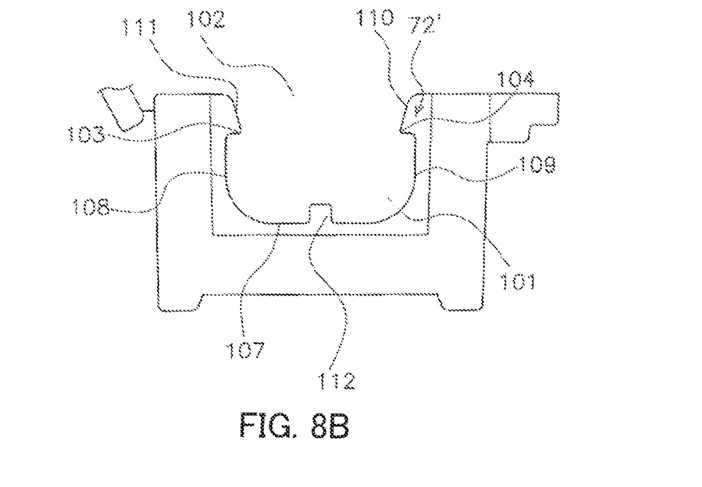
FIG. 8B is a side view illustrating another example of the holding part.

When connecting member 17 is further rotated from the state of FIG. 6B, end 96 slides with inclined part 110, and held portion 86 of connecting member 17 is fit with installation space 101 as illustrated in FIG. 5D. In the fit state, first retainer part 103 is engaged with first engaging part 91, and second retainer part 104 is engaged with second engaging part 92. Thus, held portion 86 of connecting member 17 is held by holding part 72 and the coming-off of it from installation space 101 is suppressed. In addition, since fitting parts 105 and 106 are fitted with fitted parts 93 and 94, the coming-off of held portion 86 of connecting member 17 from installation space 101 is further reduced. Note that the shapes of held portion 86 and holding part 72 need not be limited to the present embodiment, and may have the configuration illustrated in FIGS. 8A and 8B, for example. FIG. 8A illustrates held portion 86'. FIG. 8B illustrates holding part 72'.

As with held portion 86, held portion 86' includes first engaging part 91 and second engaging part 92. However, fitted parts 93 and 94 and cutouts 97a and 98a are not provided, but fitted part 99 is provided at the center of end 98. Fitted part 99 is, for example, a recess. In addition, the portion between end 95 and end 98 is curved in an outward convex shape, and the portion between end 96 and end 98 is curved in an outward convex shape.

As with holding part 72, holding part 72' includes first retainer part 103 and second retainer part 104. However, fitting parts 105 and 106 are not provided, but fitting part 112 is provided at the center of edge 107. Fitting part 112 is, for example, a protruding part protruded from edge 107 toward installation space 101. In addition, the portion between edge 108 and edge 107 is curved in an outward convex shape, and the portion between edge 108 and edge 109 is curved in an outward convex shape. These curvatures of holding part 72' correspond to the curvatures of held portion 86'.

Figure 9A:
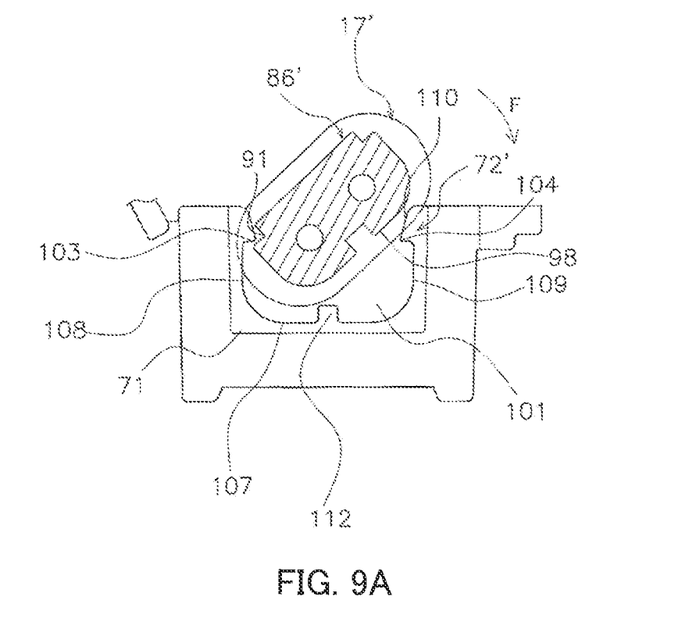
FIG. 9A is a diagram illustrating an operation of attaching the connecting member of FIG. 8A to the holding part of FIG. 8B.
Figure 9B:
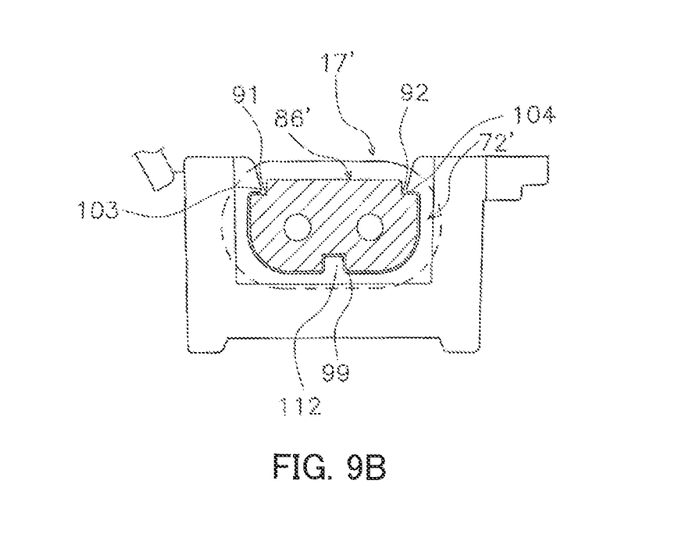
FIG. 9B is a diagram illustrating an operation of attaching the connecting member of FIG. 8A to the holding part of FIG. 8B.

Also in this case, as illustrated in FIG. 9A, with first engaging part 91 of held portion 86' fit with first retainer part 103 of holding part 72', connecting member 17 is rotated (arrow F) to dispose it in installation space 101. When connecting member 17 is rotated in the arrow F direction, the curvature between end 96 and end 98 of held portion 86 of connecting member 17 slides with inclined part 110, and wall part 71 bends so as to open in width direction D to increase opening 102, as in FIG. 6B. When connecting member 17 is further rotated, end 96 slides with inclined part 110, and held portion 86 of connecting member 17 is fit with installation space 101 as illustrated in FIG. 9B. Note that in the state where held portion 86' is disposed in arrangement space 101 of holding part 72' as illustrated in FIG. 9B, first retainer part 103 is engaged with first engaging part 91, second retainer part 104 is engaged with second engaging part 92, and fitting part 112 is fitted with fitted part 99.

Moving Member

Figure 10A:
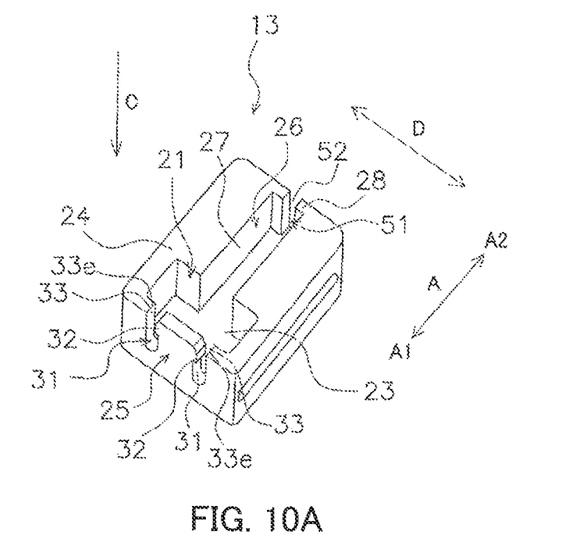
FIG. 10A is a perspective view of a moving member of the outer casing attachment structure of FIG. 1.
Figure 10B:
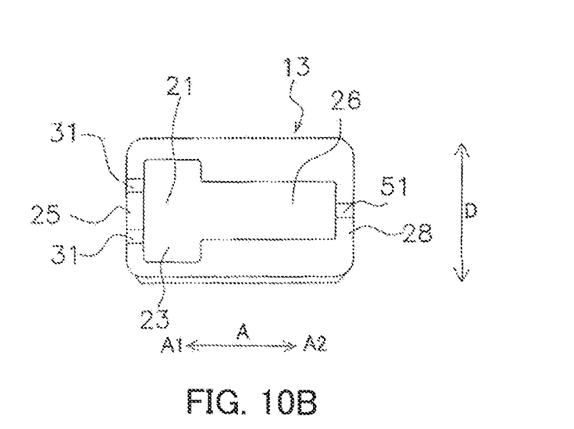
FIG. 10B is a plan view of the moving member.
Figure 10C:
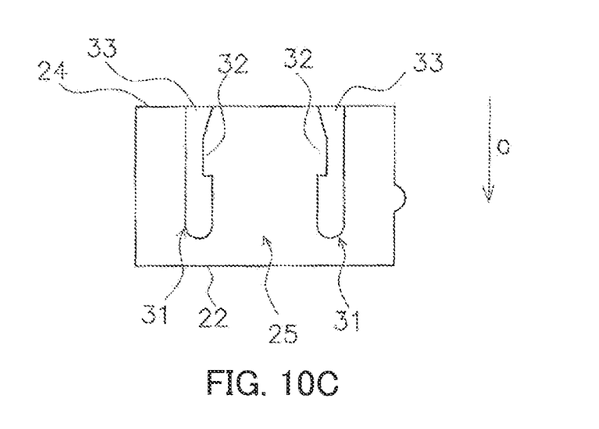
FIG. 10C is a front view of the moving member.

Moving member 13 can move in the axis direction of first inner cables 11a and 11b. Moving member 13 includes first housing part 21 that houses first terminal member 12. FIG. 10A is a perspective view of moving member 13. FIG. 10B is a plan view of moving member 13. FIG. 10C is a front view of moving member 13.

Moving member 13 has a substantially cuboid external shape. First housing part 21 can house first terminal member 12. First housing part 21 is a space formed in moving member 13, and is formed to match first terminal member 12. Note that in the present embodiment, first terminal member 12 has a substantially cuboid shape, and therefore first housing part 21 also has a substantially cuboid shape; however, the present invention is not limited thereto. First housing part 21 of moving member 13 includes first opening 23 (see FIG. 10A) for insertion of first terminal member 12 to first housing part 21 in surface 24 on the opposite side of support surface 22 (see FIG. 10C) supported by holding member 14. Moving member 13 is supported by holding member 14 at support surface 22. Support surface 22 is supported by bottom surface 62 of holding member 14. As illustrated in FIG. 10A, moving member 13 includes first wall part 25 that serves as a partition between first housing part 21 and the outside in axis direction A.

First wall part 25 includes a plurality of extending portions 31 where each of the plurality of first inner cables 11a and 11b extends from first terminal member 12 housed in first housing part 21, and retainer part 32 provided in each extending portion 31. Each extending portion 31 includes second opening 33 for insertion of first inner cables 11a and 11b to extending portion 31 on insertion direction C side of first terminal member 12 from first opening 23. As illustrated in FIG. 10C, second opening 33 is provided in surface 24 on the side opposite to support surface 22 of moving member 13.

First opening 23 and second opening 33 are connected. First terminal member 12 and the plurality of first inner cables 11a and 11b are integrally inserted to first housing part 21 and extending portion 31 through the connected first opening 23 and second opening 33. Note that extending portion 31 also includes edge part 33e that forms second opening 33. Extending portion 31 includes a hole with a slit-shape for example, and first inner cables 11a and 11b are protruded from the hole. Retainer part 32 prevents the coming-off of first inner cables 11a and 11b from second opening 33. Retainer part 32 is, for example, a protrusion formed from one toward the other of the facing surfaces of the slit-shaped hole.

As illustrated in FIG. 10A, moving member 13 includes second housing part 26 that houses second terminal member 16 to which second inner cable 15 is connected. While second terminal member 16 is a columnar-shaped member as illustrated in FIG. 1 and second housing part 26 is slender in the axis direction A in the present embodiment, their shapes are not limited as long as second terminal member 16 can be housed in second housing part 26. Note that second terminal member 16 preferably has a shape that matches second housing part 26, since such a shape less causes positional displacement and the like. Second housing part 26 includes third opening 27 for insertion of second terminal member 16 to second housing part 26 on the opposite side of support surface 22. In the present embodiment, second housing part 26 is communicated with first housing part 21, and therefore third opening 27 is connected to first opening 23; however, this is not imitative, and second housing part 26 need not be provided up to first housing part 21, and need not be communicated with first housing part 21.

As illustrated in FIG. 10A, moving member 13 includes second wall part 28 that serves as a partition between second housing part 26 and the outside of second inner cable 15 in the axis direction A. Second wall part 28 includes extending portion 51 where second inner cable 15 extends from second terminal member 16 housed in second housing part 26. Extending portion 51 includes fourth opening 52 for insertion of the second cable to extending portion 51 on the insertion direction side of second terminal member 16 from third opening 27. Fourth opening 52 and third opening 27 are communicated with each other. Extending portion 51 includes a slit-shaped hole, for example. Note that although not described in the present embodiment, a retainer part similar to extending portion 31 may be provided at the slit-shaped hole.

Second Casing Cap and Second Outer Casing

As illustrated in FIG. 1, cable coupling structure 1 of the present embodiment includes connecting member 19 and second outer casing 20. Second outer casing 20 covers the outside of second inner cable 15 serving as an inner cable on the outside of holding member 14. Connecting member 19 is attached to holding member 14. A connection hole is formed at the end of connecting member 19 on the side opposite to holding member 14, and second outer casing 20 is inserted to the connection hole. In this manner, second outer casing 20 is connected to connecting member 19. In the connection hole, an irregularity may be formed at the inner peripheral surface as with connection holes 82a and 82b. In addition, a through hole is formed in connecting member 19, and second inner cable 15 is inserted to it.

Figure 11:
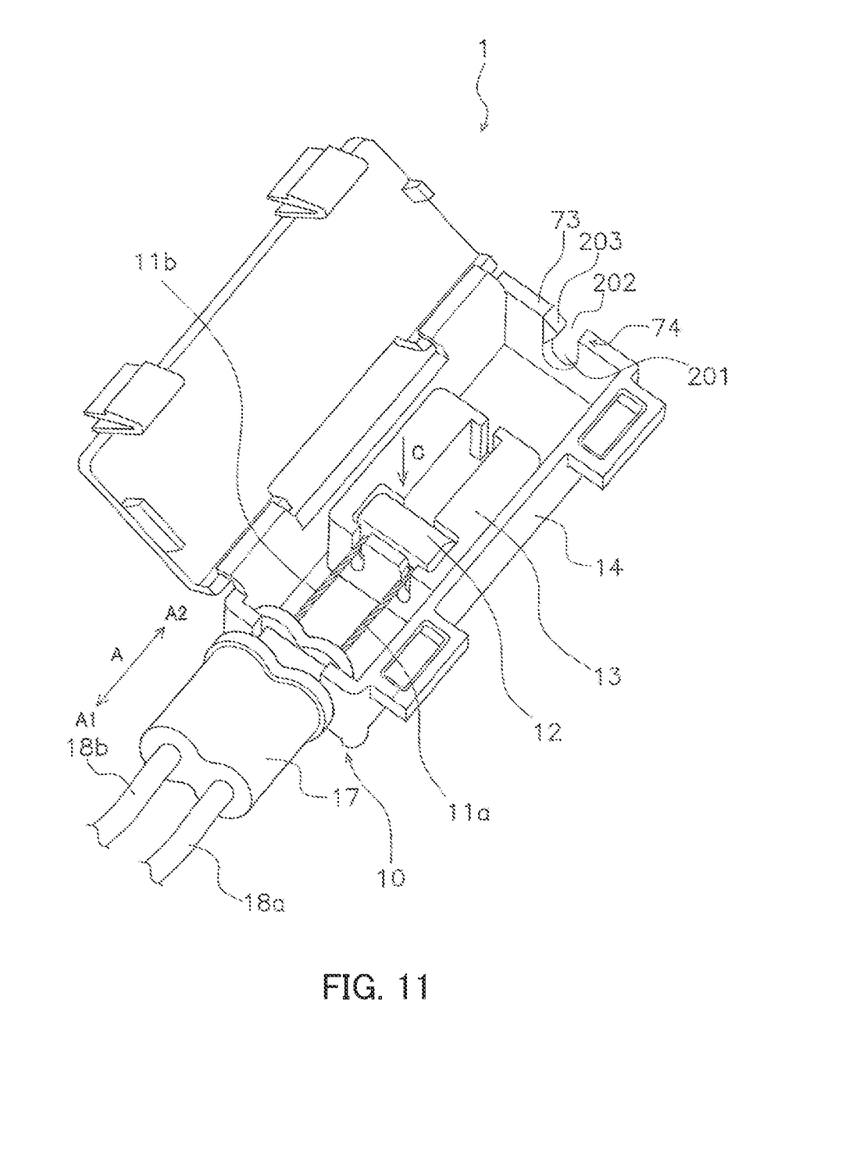
FIG. 11 is a perspective view illustrating an assembly state of the cable coupling structure of FIG. 1.

As illustrated in FIG. 11, in holding member 14, holding part 74 is formed in wall part 73. As illustrated in FIG. 11, holding part 74 includes installation space 201 for disposing connecting member 19, opening 202 for insertion of connecting member 19 to installation space 201, and retainer part 203 for preventing the coming-off of connecting member 19 from installation space 201. Installation space 201 and opening 202 are, for example, slit-shaped holes formed in wall part 73, and retainer part 203 is, for example, a protrusion protruded from one toward the other of the facing end surfaces of the slit-shaped hole.

Assembly

An exemplary procedure for assembling cable coupling structure 1 of the present embodiment is described below. First outer casing 18a is inserted to connection hole 82a of connecting member 17, and first outer casing 18b is inserted to connection hole 82b of connecting member 17. First inner cables 11a and 11b connected to first terminal member 12 are inserted to through holes 83a and 83b of connecting member 17, and first outer casings 18a and 18b, respectively. In this manner, in the state where first inner cables 11a and 11b, first outer casings 18a and 18b and connecting member 17 are assembled, connecting member 17 is attached to holding member 14 as illustrated in FIGS. 6A, 6B and 7. As described above, to attach holding member 14 to connecting member 17, connecting member 17 is rotated (arrow F) to dispose it in installation space 101 with first engaging part 91 of held portion 86 fit with first retainer part 103 of holding part 72.

Then, first terminal member 12 is housed in first housing part 21 through first opening 23, and the plurality of first inner cables 11a and 11b are also inserted to extending portion 31 through second opening 33. This state is illustrated in FIG. 11. In the state illustrated in FIG. 11, lid part 65 is not closed, and second inner cable 15, second terminal member 16, second outer casing 20 and connecting member 19 are not attached to holding member 14 and moving member 13. In the state illustrated in FIG. 11, holding member 14 is attached to a predetermined component such as the hood with attaching part 67, and first inner cables 11a and 11b are wired in the predetermined component.

Then, when combining the predetermined component (such as the hood) and other component (such as the vehicle main body frame), second inner cable 15, second terminal member 16, second outer casing 20 and connecting member 19 are attached to holding member 14 and moving member 13 while second inner cable 15 is wired to the other component. Finally, as illustrated in FIG. 12, the opening of main body part 64 is closed with lid part 65. In this manner, even in the case where first inner cables 11a and 11b are wired with lid part 65 open, connecting member 17 is held to holding member 14 by holding part 72, and thus the coming-off of connecting member 17 from holding part 72 can be suppressed.

Effects or the Like

As described above, holding parts 72 and 72' include first retainer part 103 and second retainer part 104, and connecting members 17 and 17' include first engaging part 91 that engages with first retainer part 103 and second engaging part 92 that engages with second retainer part 104. In this manner, connecting member 17 that connects first outer casings 18a and 18b to holding member 14 is locked to holding parts 72 and 72' of holding member 14 at the two portions, and thus even when first inner cables 11a and 11b move, the coming-off from holding parts 72 and 72' can be suppressed by restricting the movement of connecting member 17. With the engagement of the protrusions of first retainer part 103 and second retainer part 104 with the recesses of first engaging part 91 and second engaging part 92, even when first inner cables 11a and 11b move, the movement of connecting members 17 and 17' at holding parts 72 and 72' is restricted and thus the coming-off of connecting members 17 and 17' from holding parts 72 and 72' can be prevented.

With the fitting of fitting parts 105 and 106 with fitted parts 93 and 94, even when first inner cables 11a and 11b move, the movement of connecting member 17 at holding part 72 can be further prevented and thus the coming-off of connecting member 17 from holding part 72 can be prevented. In addition, with the fitting of fitting part 112 with fitted part 99, even when first inner cables 11a and 11b move, the movement of connecting member 17' at holding part 72' can be further prevented and thus the coming-off of connecting member 17' from holding part 72' can be prevented.

In this manner, with the fitting of the protrusions of fitting parts 105 and 106 with the recesses of fitted parts 93 and 94, even when first inner cables 11a and 11b move, the movement of connecting member 17 at holding part 72 can be prevented, and thus the coming-off of connecting member 17 from holding part 72 can be suppressed. In addition, with the fitting of the protrusion of fitting part 112 with the recess of fitted part 99, even when first inner cables 11a and 11b move, the movement of connecting member 17' at holding part 72' can be prevented, and the coming-off of connecting member 17' from holding part 72' can be suppressed.

With inclined part 110 provided on the outside of second retainer part 104, connecting member 17 can be disposed in installation space 101 along inclined part 110 while being rotated, and thus it is easy to attach connecting members 17 and 17' to holding parts 72 and 72'.

INDUSTRIAL APPLICABILITY

The outer casing attachment structure of the embodiment of the present invention provides an effect of suppressing the coming-off of the connecting member of the outer casing from the holding part, and is useful as a cable coupling structure and the like for vehicles that employ a double latch and the like.

REFERENCE SIGNS LIST

1: Cable coupling structure
10: Attachment structure
11a: First inner cable (an example of inner cable)
11b: First inner cable (an example of inner cable)
14: Holding member
17: Connecting member (an example of connecting member)
18a: First outer casing (an example of outer casing)
18b: First outer casing (an example of outer casing)
72: Holding part (an example of holding part)
91: First engaging part
92: Second engaging part
101: Installation space (an example of installation space)
102: Opening
103: First retainer part
104: Second retainer part

What is claimed is:

1. An outer casing attachment structure, comprising:
   a plurality of inner cables extending in a same axis direction;
   a plurality of outer casings to which the plurality of inner cables is respectively inserted;
   a connecting member to which ends of the plurality of outer casings are connected;
   a moving member to which ends of the plurality of inner cables, the ends protruding from the plurality of outer casings; and
   a holding member having a box-shaped body configured to contain the moving member such that the moving member is capable of moving in the axis direction, the box-shaped body including a wall part that is positioned at an end part of the box-shaped body in the axis direction and extends vertically with respect to the axis direction, the wall part being provided with a holding part configured to hold the connecting member,
   wherein the holding part comprises a cutout part which is disposed to penetrate the wall part in the axis direction and which comprises:
   an installation space where the connecting member is disposed; and
   an opening provided to the wall part to make the installation space in communication with an outside such that insertion of the connecting member to the installation space in an insertion direction perpendicular to the axis direction,
   wherein the holding part includes a first retainer part and a second retainer part formed on both sides of the opening, and
   wherein the connecting member includes a first engaging part configured to engage with the first retainer part, and a second engaging part configured to engage with the second retainer part.

2. The outer casing attachment structure according to claim 1,
   wherein each of the first retainer part and the second retainer part is a protrusion; and
   wherein each of the first engaging part and the second engaging part is a recess formed in the connecting member.

3. The outer casing attachment structure according to claim 1,
   wherein the holding part includes a fitting part formed at an edge of the installation space that faces the opening;
   wherein the connecting member includes a fitted part configured to be fitted with the fitting part; and
   wherein the fitting part is fit with the fitted part in a state where the connecting member is held by the holding part.

4. The outer casing attachment structure according to claim 3,
   wherein the fitting part is a protrusion protruded from the edge of the installation space; and
   wherein the fitted part is a recess formed in the connecting member.

5. The outer casing attachment structure according to claim 1,
   wherein the holding part includes an inclined part provided on the outside of the second retainer part; and
   wherein the inclined part is formed to guide the second engaging part side of the connecting member to the installation space when the connecting member is rotated about an axis parallel to the axis direction in a state where the first engaging part is engaged with the first retainer part to insert the connecting member to the installation space.

6. The outer casing attachment structure according to claim 1,
   the second engaging part is configured to be engaged with the second retainer part when the connecting member is rotated about an axis parallel to the axis direction in a state where the first engaging part is engaged with the first retaining part to make the plurality of outer casings positioned side-by-side in a direction perpendicular to both the axis direction and the insertion direction.

* * * * *